United States Patent
Sato et al.

(10) Patent No.: US 9,790,306 B2
(45) Date of Patent: Oct. 17, 2017

(54) RUBBER COMPOSITION FOR USE IN TIRE TREADS

(71) Applicant: The Yokohama Rubber Co., LTD., Minato-ku, Tokyo (JP)

(72) Inventors: Masaki Sato, Hiratsuka (JP); Satoshi Mihara, Hiratsuka (JP); Yayoi Akahori, Hiratsuka (JP); Shin Tsukishima, Hiratsuka (JP); Ayumi Naka, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 270 days.

(21) Appl. No.: 14/424,435

(22) PCT Filed: Aug. 27, 2013

(86) PCT No.: PCT/JP2013/072890
§ 371 (c)(1),
(2) Date: Feb. 26, 2015

(87) PCT Pub. No.: WO2014/034673
PCT Pub. Date: Mar. 6, 2014

(65) Prior Publication Data
US 2015/0218298 A1    Aug. 6, 2015

(30) Foreign Application Priority Data
Aug. 30, 2012 (JP) ................ 2012-189759

(51) Int. Cl.
| | | |
|---|---|---|
| *C08F 236/10* | (2006.01) | |
| *C08K 5/37* | (2006.01) | |
| *C08K 5/053* | (2006.01) | |
| *C08L 15/00* | (2006.01) | |
| *B60C 1/00* | (2006.01) | |
| *C08K 3/36* | (2006.01) | |
| *C08K 5/43* | (2006.01) | |
| *C08K 5/548* | (2006.01) | |

(52) U.S. Cl.
CPC .......... *C08F 236/10* (2013.01); *B60C 1/0016* (2013.01); *C08L 15/00* (2013.01); *C08K 3/36* (2013.01); *C08K 5/43* (2013.01); *C08K 5/548* (2013.01)

(58) Field of Classification Search
CPC ......... C08F 236/10; C08L 15/00; C08K 3/36; C08K 5/548; C08K 5/43; C08K 5/37; C08K 5/053; B60C 1/0016; C08C 19/20; C08C 19/25
See application file for complete search history.

(56) References Cited

U.S. PATENT DOCUMENTS

| | | | |
|---|---|---|---|
| 6,057,397 A * | 5/2000 | Takagishi | B60C 1/00 524/492 |
| 2003/0119995 A1* | 6/2003 | Hong | C08K 5/06 525/332.6 |
| 2007/0299197 A1 | 12/2007 | Lin et al. | |

FOREIGN PATENT DOCUMENTS

| | | |
|---|---|---|
| JP | 2007-262307 | 10/2007 |
| JP | 2007-534833 | 11/2007 |
| JP | 2008-143953 | * 6/2008 |
| JP | 2009126907 | 6/2009 |
| JP | 2012-082325 | 4/2012 |
| WO | WO 96/23027 | 8/1996 |
| WO | WO 2005/105854 | 11/2005 |
| WO | WO 2007/111144 | 10/2007 |

OTHER PUBLICATIONS

JP 2008-143953, Jun. 2008, machine translation.*
International Search Report regarding International Application No. PCT/JP2013/072890 dated Oct. 1, 2013, 4 pages, Japan.

* cited by examiner

*Primary Examiner* — Roberto Rabago
(74) *Attorney, Agent, or Firm* — Thorpe North and Western

(57) ABSTRACT

A rubber composition for use in tire treads comprising from 60 to 130 parts by weight of silica per 100 parts by weight of diene rubber containing not less than 50% by weight of hydroxyl group-containing modified styrene butadiene rubber, in which the weight ratio of oil to filler containing the silica is not greater than 0.25, and a silane coupling agent having a mercapto group and an Si—O bond is compounded in an amount from 4 to 15% by weight of the silica content, and diethylene glycol is compounded in an amount from 1 to 6% by weight of the silica content.

11 Claims, No Drawings

RUBBER COMPOSITION FOR USE IN TIRE TREADS

TECHNICAL FIELD

The present technology relates to a rubber composition for use in tire treads and particularly relates to a rubber composition for use in tire treads that enhances low rolling resistance and wet performance to conventional levels or above while maintaining or enhancing extrudability.

BACKGROUND

Increased interest in global environmental issues has led to a demand for superior fuel consumption performance in pneumatic tires, along with high wet performance and superior safety performance. As a result, by compounding silica in rubber compositions that form tread portions, dynamic viscoelastic characteristics of the tread rubber such as loss tangent (tanδ) have been improved, wet performance has been improved while heat build-up has been suppressed, rolling resistance reduced, and fuel consumption performance improved. However, the particles of silica tend to aggregate together through hydrogen bonds of silanol groups, which are the surface functional group thereof, and affinity with diene rubber and dispersion tends to be poor, and the effects of improving low rolling resistance and wet performance are not sufficiently obtained.

For this reason, silica dispersibility in the rubber composition has been improved by compounding a silane coupling agent containing mercapto groups together with silica (for example, refer to Japanese Unexamined Patent Application Publication No. 2009-126907A). A mercapto group-containing silane coupling agent has high affinity with silica and is excellent in improving dispersibility, and improvements in rolling resistance and wet performance are seen. However, in a rubber composition in which a mercapto group-containing silane coupling agent is compounded, there is the problem that extrudability is poor, due to high viscosity and scorch (premature curing) readily occurring and the like, and even in Japanese Unexamined Patent Application Publication No. 2009-126907A, an attempt to improve viscosity and workability was made but the improvement were not necessarily sufficient.

SUMMARY

The present technology provides a rubber composition for use in tire treads that enhances low rolling resistance and wet performance to conventional levels or above while maintaining or enhancing extrudability.

An example rubber composition for use in tire treads of the present technology is a rubber composition including from 60 to 130 parts by weight of silica per 100 parts by weight of diene rubber containing not less than 50% by weight of hydroxyl group-containing modified styrene butadiene rubber, wherein the weight ratio of the oil with respect to the weight of filler containing the silica is not greater than 0.25, and a silane coupling agent having a mercapto group and an Si—O bond is compounded in an amount from 4 to 15% by weight of the silica content, and diethylene glycol is compounded in an amount from 1 to 6% by weight of the silica content.

In the rubber composition for tire treads of the present technology, dispersibility of silica in the diene rubber can be improved and excellent low rolling resistance and wet performance can be obtained because from 60 to 130 parts by weight of silica is compounded per 100 parts by weight of diene rubber containing not less than 50% by weight of hydroxyl group-containing modified styrene butadiene rubber, and a silane coupling agent having a mercapto group and an Si—O bond is compounded in an amount from 4 to 15% by weight of the silica content. Furthermore, viscosity of the rubber composition can be improved, scorch (premature curing) can be suppressed and extrudability can be maintained or improved because diethylene glycol is compounded in the rubber composition in an amount from 1 to 6% by weight of the silica content.

In the rubber composition for tire treads of the present technology, bis(3-triethoxysilylpropyl)tetrasulfide is preferably compounded in an amount from 2 to 5% by weight of the silica content, which can further enhance the dispersibility of silica and further improve low rolling resistance and wet performance.

Furthermore, a vulcanization retarder represented by general formula (1) below is preferably compounded in an amount not greater than 1.0 parts by weight per 100 parts by weight of the diene rubber, which can suppress scorch (premature curing) while maintaining low rolling resistance and wet performance of the rubber composition.

[Formula 1]

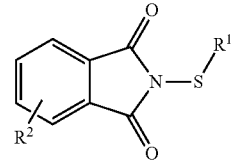

(1)

(In the formula, $R^1$ is a linear hydrocarbon group, alicyclic hydrocarbon group or aromatic hydrocarbon group having from 1 to 10 carbons, $R^2$ is a hydrogen atom, a linear hydrocarbon group or alkoxy group having from 1 to 4 carbons, or a branched hydrocarbon group or alkoxy group having from 3 to 4 carbons.)

The diene rubber preferably contains not greater than 45% by weight of natural rubber, which can improve cohesion as a rubber composition and can improve shapability and workability.

Also, the silane coupling agent having a mercapto group and an Si—O bond may be a mercaptosilane compound represented by general formula (2) below, or a copolymer having the structures of general formulas (3) and (4) below, or a polysiloxane having an average composition formula represented by general formula (5) below, which can enhance affinity with silica and improve its dispersibility.

[Formula 2]

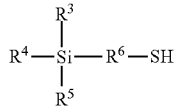

(2)

(In the formula, $R^3$, $R^4$, and $R^5$ are mutually independently selected from hydrogen, alkyl groups having from 1 to 8 carbons, alkoxy groups having from 1 to 8 carbons, linear polyether groups having a chain length of from 4 to 30, and aryl groups having from 6 to 30 carbons, and, at least one is the alkoxy group and at least one is the linear polyether group, and $R^6$ is an alkylene group having from 1 to 30 carbons.)

[Formula 3]

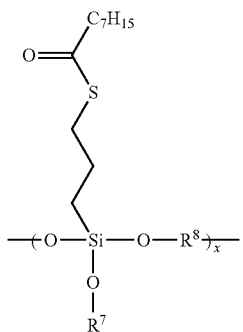

(3)

(In the formula, $R^7$ and $R^8$ may form a ring structure, and $R^7$ is selected from hydrogen, halogen, or alkyl groups or alkylene groups having from 1 to 30 carbons, alkenyl groups or alkenylene groups having from 2 to 30 carbons, alkynyl groups or alkynylene groups having from 2 to 30 carbons, and groups in which a terminal of the above alkyl group or alkenyl group is substituted with a hydroxyl group or carboxyl group; $R^8$ is an alkylene group having from 1 to 30 carbons, an alkenylene group having from 2 to 30 carbons, or an alkynylene group having from 2 to 30 carbons; x is an integer of 1 or greater.)

[Formula 4]

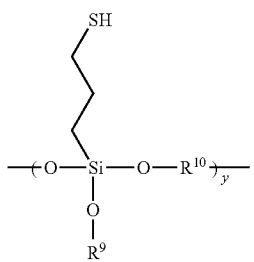

(4)

(In the formula, $R^9$ and $R^{10}$ may form a ring structure, and $R^9$ is selected from hydrogen, halogen, or alkyl groups or alkylene groups having from 1 to 30 carbons, alkenyl groups or alkenylene groups having from 2 to 30 carbons, alkynyl groups or alkynylene groups having from 2 to 30 carbons, and groups in which a terminal of the above alkyl group or alkenyl group is substituted with a hydroxyl group or carboxyl group; $R^{10}$ is an alkylene group having from 1 to 30 carbons, an alkenylene group having from 2 to 30 carbons, or an alkynylene group having from 2 to 30 carbons; y is an integer of 1 or greater.)

[Formula 5]

$(A)_a(B)_b(C)_c(D)_d(R^{11})_e SiO_{(4-2a-b-c-d-e)/2}$ (5)

(In the formula, A is a bivalent organic group containing a sulfide group; B is a monovalent hydrocarbon group having from 5 to 10 carbons; C is a hydrolyzable group; D is an organic group containing a mercapto group; $R^{11}$ is a monovalent hydrocarbon group having from 1 to 4 carbons; and a to e satisfy the relationships $0 \le a < 1$, $0 \le b < 1$, $0 < c < 3$, $0 < d < 1$, $0 \le e < 2$, $0 < 2a+b+c+d+e < 4$; however, at least one of a and b is not 0).

A pneumatic tire that uses this rubber composition in the tread portions can have excellent productivity and quality stability due to its excellent extrudability, and can improve low rolling resistance and wet performance to conventional levels or above.

DETAILED DESCRIPTION

In the rubber composition for use in tire treads of the present technology, the rubber component is a diene rubber, and that diene rubber necessarily contains a hydroxyl group-containing modified styrene butadiene rubber.

The modified styrene butadiene rubber necessarily has a hydroxyl group in at least one part of the molecular chain. By compounding the hydroxyl group-containing modified styrene butadiene rubber, affinity with silica is increased, and dispersibility thereof is improved. As a result, the effects of the silica are further enhanced and low rolling resistance and wet performance can both be improved.

Any hydroxyl group-containing modified styrene butadiene rubber that is regularly used in rubber compositions for tire may be compounded.

The content of the hydroxyl group-containing modified styrene butadiene rubber is not less than 50% by weight, and preferably from 55 to 90% by weight, per 100% by weight of diene rubber. If the content of the hydroxyl group-containing modified styrene butadiene rubber is less than 50% by weight, silica dispersibility is insufficient, and the effects of improving rolling resistance and wet performance are not sufficiently obtained.

In the present technology, the diene rubber preferably contains natural rubber, which can improve cohesion as a rubber composition and can improve shapability and workability. A rubber composition with a high silica content may have poor cohesion as rubber, and sheeting capability may be adversely affected. For example, after the rubber composition is kneaded, in the process in which it is passed through rollers to make sheets which are then stacked, the sheets tend to become dry and crumbly, and the sheets readily tear and their ends readily chip. As a result, workability in the extrusion process is also adversely affected. In contrast, by compounding natural rubber, cohesion as a rubber composition can be improved, and shapability and workability can be improved.

The content of natural rubber is preferably not greater than 45% by weight, and more preferably from 10 to 45% by weight, per 100% by weight of diene rubber. If the content of natural rubber exceeds 45% by weight, the effect of improving rolling resistance may be small. A natural rubber that is regularly used in rubber compositions for use in tires is preferably used.

In the present technology, diene rubbers other than the modified styrene butadiene rubber described above or natural rubber can be compounded as a rubber component. Examples of other diene rubbers include isoprene rubber, butadiene rubber, unmodified styrene butadiene rubber, butyl rubber, halogenated butyl rubber, and the like. Isoprene rubber, butadiene rubber, and unmodified styrene butadiene rubber are preferred. A single rubber may be used or multiple rubbers may be blended and used as the diene rubber. The content of the other diene rubber is not greater than 50%, and is preferably not greater than 35% by weight, per 100% by weight of the diene rubber.

The rubber composition of the present technology necessarily contains silica. By compounding silica, the dynamic viscoelastic characteristics of the rubber composition such as loss tangent (tanδ) can be improved, heat build-up can be suppressed, rolling resistance reduced, and fuel consumption performance improved, while wet performance can also be improved. The compounded amount of silica is from 60 to 130 parts by weight, and preferably from 65 to 120 parts by weight, per 100 parts by weight of the diene rubber. If the compounded amount of silica is less than 60 parts by weight, the effects of improving rolling resistance and wet performance are not sufficiently obtained. If the compounded amount of silica exceeds 130 parts by weight, rolling resistance is adversely affected.

The silica may be any silica that is regularly used in rubber compositions for use in tire treads. Examples thereof include wet method silica, dry method silica, surface treated silica, and the like. The silica to be used may be appropriately selected from commercially available products. Additionally, a silica obtained through a regular manufacturing method may be used.

In the present technology, other fillers aside from silica may be compounded. Examples of other fillers include carbon black, clay, mica, talc, calcium carbonate, aluminum hydroxide, aluminum oxide, titanium oxide, and the like. Among these, carbon black, calcium carbonate, and aluminum hydroxide are preferred. By compounding other fillers, the strength of the rubber composition can be increased and steering stability when the rubber is formed into a tire can be enhanced. Furthermore, by including carbon black in the rubber composition for tire treads, strength and wear resistance of the rubber composition can be enhanced.

The compounded amount of other fillers such as carbon black is preferably from 3 to 30 parts by weight per 100 parts by weight of diene rubber.

In the rubber composition of the present technology, by compounding a silane coupling agent having a mercapto group and an Si—O bond (also referred to as "mercapto-based silane coupling agent" hereinafter) together with silica, the dispersibility of silica can be enhanced and the performance of silica can be fully manifested. The mercapto-based silane coupling agent necessarily contains an Si—O bond and a mercapto group (—SH) in its molecular chain. Examples of the Si—O bond include structures in which a hydrogen atom, halogen atom, carbon atom, nitrogen atom, silicon atom or the like is bonded to the oxygen atom of Si—O—. Among these, a bond having the structure Si—O—H or Si—O—C is preferred.

In the present technology, the effects of silica, namely low rolling resistance and wet performance, can be elicited due to the fact that affinity with silica is increased and the dispersibility thereof is improved by compounding a mercapto-based silane coupling agent. The compounded amount of the mercapto-based silane coupling agent is from 4 to 15 weight %, and preferably from 5 to 13 weight %, with respect to the compounded amount of the silica. If the compounded amount of the mercapto-based silane coupling agent is less than 4% by weight, the effect of improving dispersibility of the silica is not sufficiently obtained. Additionally, if the compounded amount of the mercapto-based silane coupling agent exceeds 15% by weight, the silane coupling agent will condense with itself, and the desired effects cannot be obtained.

The mercapto-based silane coupling agent is not particularly limited provided that it has a mercapto group and an Si—O bond, but it is preferably a mercaptosilane compound represented by general formula (2) below, or a copolymer having the structures of general formulas (3) and (4) below, or a polysiloxane having an average composition formula represented by general formula (5) below.

[Formula 6]

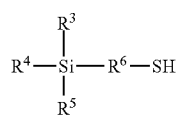

(2)

(In the formula, $R^3$, $R^4$, and $R^5$ are mutually independently selected from hydrogen, alkyl groups having from 1 to 8 carbons, alkoxy groups having from 1 to 8 carbons, linear polyether groups having a chain length of from 4 to 30, and aryl groups having from 6 to 30 carbons, and, at least one is the alkoxy group and at least one is the linear polyether group, and $R^6$ is an alkylene group having from 1 to 30 carbons.)

[Formula 7]

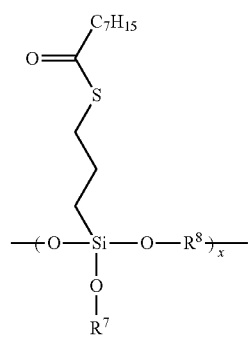

(3)

(In the formula, $R^7$ and $R^8$ may form a ring structure, and $R^7$ is selected from hydrogen, halogen, or alkyl groups or alkylene groups having from 1 to 30 carbons, alkenyl groups or alkenylene groups having from 2 to 30 carbons, alkynyl groups or alkynylene groups having from 2 to 30 carbons, and groups in which a terminal of the above alkyl group or alkenyl group is substituted with a hydroxyl group or carboxyl group; $R^8$ is an alkylene group having from 1 to 30 carbons, an alkenylene group having from 2 to 30 carbons, or an alkynylene group having from 2 to 30 carbons; x is an integer of 1 or greater.)

[Formula 8]

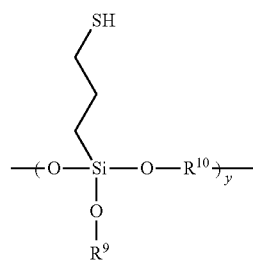

(4)

(In the formula, $R^9$ and $R^{10}$ may form a ring structure, and $R^9$ is selected from hydrogen, halogen, or alkyl groups or alkylene groups having from 1 to 30 carbons, alkenyl groups or alkenylene groups having from 2 to 30 carbons, alkynyl groups or alkynylene groups having from 2 to 30 carbons, and groups in which a terminal of the above alkyl group or alkenyl group is substituted with a hydroxyl group or carboxyl group; $R^{10}$ is an alkylene group having from 1 to 30 carbons, an alkenylene group having from 2 to 30 carbons, or an alkynylene group having from 2 to 30 carbons; y is an integer of 1 or greater.)

[Formula 9]

$$(A)_a(B)_b(C)_c(D)_d(R^{11})_e SiO_{(4-2a-b-c-d-e)/2} \quad (5)$$

(In the formula, A is a bivalent organic group containing a sulfide group; B is a monovalent hydrocarbon group having from 5 to 10 carbons; C is a hydrolyzable group; D is an organic group containing a mercapto group; $R^{11}$ is a monovalent hydrocarbon group having from 1 to 4 carbons; and a to e satisfy the relationships 0≤a<1, 0≤b<1, 0<c<3, 0<d<1, 0≤e<2, 0<2a+b+c+d+e<4; however, at least one of a and b is not 0).

In the mercapto-based silane coupling agent represented by the above general formula (2), $R^3$, $R^4$, and $R^5$ are, mutually independently, hydrogen, an alkyl group having from 1 to 8 carbons, an alkoxy group having from 1 to 8 carbons, a linear polyether group having a chain length of from 4 to 30, or an aryl group having from 6 to 30 carbons. Preferably, they are hydrogen, an alkyl group having from 1 to 8 carbons, an alkoxy group having from 1 to 3 carbons, or a linear polyether group having a chain length of from 10 to 29. The linear polyether group is preferably represented by the formula $—O—(R^{11}—O)p-R^{12}$. In the polyether portion $(R^{11}—O)p$, $R^{11}$ is an alkylene group having from 2 to 4 carbons, and preferably an ethylene group, trimethylene group ($—CH_2CH_2CH_2—$), or propylene group. $R^{11}$ may be a single type or multiple types. p is the average value of the number of repetitions of the ether portion, and is a number from 2 to 15, preferably from 3 to 10, and more preferably from 3.5 to 8. $R^{12}$ is an alkyl group having from 10 to 16 carbons, and preferably from 11 to 15 carbons. The alkyl polyether group may also be a mixture of multiple types, examples of which include $—O—(CH_2CH_2—O)_5—(CH_2)_{10}CH_3$, $—O—(CH_2CH_2—O)_5—(CH_2)_{11}CH_3$, $—O—(CH_2CH_2—O)_5—(CH_2)_{12}CH_3$, $—O—(CH_2CH_2—O)_5—(CH_2)_{13}CH_3$, $—O—(CH_2CH_2—O)_5—(CH_2)_{14}CH_3$, $—O—(CH_2CH_2—O)_3—(CH—_2)_{12}CH_3$, $—O—(CH_2CH_2—O)_4—(CH_2)_{12}CH_3$, $—O—(CH_2CH_2—O)_6—(CH_2)_{12}CH_3$, $—O—(CH_2CH_2—O)_7—(CH_2)_{12}CH_3$, and the like.

Among $R^3$, $R^4$, and $R^5$ in formula (2), at least one is an alkoxy group having from 1 to 8 carbons, at least one is a linear polyether group having a chain length of from 4 to 30, and the mercapto-based silane coupling agent represented by formula (2) necessarily has an alkoxy group and a linear polyether group.

Furthermore, $R^6$ is an alkylene group having from 1 to 30 carbons, and preferably an alkylene group having from 1 to 12 carbons.

Examples of the mercaptosilane compound represented by the above general formula (2) that are advantageously used in the present technology include:

$[C_{11}H_{23}O(CH_2CH_2O)_5](CH_2CH_2O)_2Si(CH_2)_3SH$,
$[C_{12}H_{25}O(CH_2CH_2O)_3](CH_2CH_2O)_2Si(CH_2)_3SH$,
$[C_{12}H_{25}O(CH_2CH_2O)_4](CH_2CH_2O)_2Si(CH_2)_3SH$,
$[C_{12}H_{25}O(CH_2CH_2O)_5](CH_2CH_2O)_2Si(CH_2)_3SH$,
$[C_{12}H_{25}O(CH_2CH_2O)_6](CH_2CH_2O)_2Si(CH_2)_3SH$,
$[C_{13}H_{27}O(CH_2CH_2O)_3](CH_2CH_2O)_2Si(CH_2)_3SH$,
$[C_{13}H_{27}O(CH_2CH_2O)_4](CH_2CH_2O)_2Si(CH_2)_3SH$,
$[C_{13}H_{27}O(CH_2CH_2O)_5](CH_2CH_2O)_2Si(CH_2)_3SH$,
$[C_{13}H_{27}O(CH_2CH_2O)_6](CH_2CH_2O)_2Si(CH_2)_3SH$,
$[C_{14}H_{29}O(CH_2CH_2O)_3](CH_2CH_2O)_2Si(CH_2)_3SH$,
$[C_{14}H_{29}O(CH_2CH_2O)_4](CH_2CH_2O)_2Si(CH_2)_3SH$,
$[C_{14}H_{29}O(CH_2CH_2O)_5](CH_2CH_2O)_2Si(CH_2)_3SH$,
$[C_{14}H_{29}O(CH_2CH_2O)_6](CH_2CH_2O)_2Si(CH_2)_3SH$,
$[C_{15}H_{31}O(CH_2CH_2O)_5](CH_2CH_2O)_2Si(CH_2)_3SH$,
$[C_{11}H_{23}O(CH_2CH_2O)_5]_2(CH_2CH_2O)Si(CH_2)_3SH$,
$[C_{12}H_{25}O(CH_2CH_2O)_3]_2(CH_2CH_2O)Si(CH_2)_3SH$,
$[C_{12}H_{25}O(CH_2CH_2O)_4]_2(CH_2CH_2O)Si(CH_2)_3SH$,
$[C_{12}H_{25}O(CH_2CH_2O)_5]_2(CH_2CH_2O)Si(CH_2)_3SH$,
$[C_{12}H_{25}O(CH_2CH_2O)_6]_2(CH_2CH_2O)Si(CH_2)_3SH$,
$[C_{13}H_{27}O(CH_2CH_2O)_3]_2(CH_2CH_2O)Si(CH_2)_3SH$,
$[C_{13}H_{27}O(CH_2CH_2O)_4]_2(CH_2CH_2O)Si(CH_2)_3SH$,
$[C_{13}H_{27}O(CH_2CH_2O)_5]_2(CH_2CH_2O)Si(CH_2)_3SH$,
$[C_{13}H_{27}O(CH_2CH_2O)_6]_2(CH_2CH_2O)Si(CH_2)_3SH$,
$[C_{14}H_{29}O(CH_2CH_2O)_3]_2(CH_2CH_2O)Si(CH_2)_3SH$,
$[C_{14}H_{29}O(CH_2CH_2O)_4]_2(CH_2CH_2O)Si(CH_2)_3SH$,
$[C_{14}H_{29}O(CH_2CH_2O)_6]_2(CH_2CH_2O)Si(CH_2)_3SH$,
$[C_{15}H_{31}O(CH_2CH_2O)_5]_2(CH_2CH_2O)Si(CH_2)_3SH$, and the like. Among these, $[C_1H_{27}O—(CH_2CH_2O)_5]_2(CH_2CH_2O)Si(CH_2)_3SH$ and $[C_{13}H_{27}O—(CH_2CH_2O)_5](CH_2CH_2O)_2Si(CH_2)_3SH$ are preferred.

In the mercaptosilane compounds having segments represented by the above general formulas (3) and (4), a ring structure may be formed by $R^7$ and $R^8$, and a ring structure may be formed by $R^9$ and $R^{10}$. $R^7$ and $R^9$ are selected from hydrogen, halogen, or alkyl groups or alkylene groups having from 1 to 30 carbons, alkenyl groups or alkenylene groups having from 2 to 30 carbons, alkynyl groups or alkynylene groups having from 2 to 30 carbons, and groups in which a terminal of the above alkyl group or alkenyl group is substituted with a hydroxyl group or carboxyl group. The above alkyl groups, alkynyl groups, alkynylene groups, alkylene groups, alkenylene groups, and alkynylene groups each may be either branched or unbranched.

$R^8$ and $R^{10}$ are selected from alkylene groups having from 1 to 30 carbons, alkenylene groups having from 2 to 30 carbons, and alkynylene groups having from 2 to 30 carbons. The above alkylene groups, alkenylene groups, and alkynylene groups each may be either branched or unbranched.

The content of segments represented by the above general formula (3) is preferably from 20 to 99 mol %, and more preferably from 30 to 95 mol %. If the content of segments of formula (3) is less than 20 mol %, it is difficult to balance low rolling resistance, wet performance, and wear resistance. Furthermore, if the content of segments of formula (3) exceeds 99 mol %, chemical bonding between the rubber and silica via the silane coupling agent does not fully occur, and low rolling resistance, wet performance, and wear resistance are adversely affected.

The content of segments represented by the above general formula (4) is preferably from 1 to 80 mol %, and more preferably from 5 to 70 mol %. If the content of segments represented by formula (4) is less than 1 mol %, chemical bonding between the rubber and silica via the silane coupling agent does not fully occur, and low rolling resistance, wet performance, and wear resistance are adversely affected. If the content of segments represented by formula (4) exceeds 80 mol %, it is difficult to balance processability with low rolling resistance, wet performance, and wear resistance.

Examples of the mercapto-based silane coupling agent having the segments represented by general formulas (3) and (4) that are advantageously used in the present technology include NXT-Z30 ($R^7$, $R^9$: ethyl groups; $R^8$, $R^{10}$: ethylene groups; 70 mol % segments represented by formula (3); 30 mol % segments represented by formula (4); mercapto group content: 4%), NXT-Z45 ($R^7$, $R^9$: ethyl groups; $R^8$, $R^{10}$: ethylene groups; 55 mol % segments represented by formula (3); 45 mol % segments represented by formula (4); mercapto group content: 6%), and NXT-Z60 ($R^7$, $R^9$: ethyl groups; $R^8$, $R^{10}$: ethylene groups; 40 mol % segments represented by formula (3); 60 mol % segments represented by formula (4); mercapto group content: 9%), all manufactured by Momentive Performance Materials Inc.

The mercapto-based silane coupling agent having the average composition formula represented by the above general formula (5) has a siloxane backbone as its backbone. The siloxane backbone may be either a linear, branched, or three-dimensional structure, or a combination thereof.

In the above general formula (5), at least one of a and b is not 0. That is, at least one of a and b is greater than 0, and both a and b may be greater than 0. Thus, this polysiloxane necessarily contains at least one selected from a bivalent organic group A containing a sulfide group and a monovalent hydrocarbon group B having from 5 to 10 carbons.

When the silane coupling agent comprising the polysiloxane having the average composition formula represented by the above general formula (5) contains the monovalent hydrocarbon group B having from 5 to 10 carbons, the mercapto groups are protected and the Mooney scorch time becomes longer, and at the same time, processability is excellent due to outstanding affinity with the rubber. For this reason, it is preferable if the subscript b of the hydrocarbon group B in general formula (5) satisfies $0.10 \leq b \leq 0.89$. Specific examples of the hydrocarbon group B are monovalent hydrocarbon groups having preferably from 6 to 10 carbons, and more preferably from 8 to 10 carbons, such as a hexyl group, an octyl group, a decyl group and the like.

When the silane coupling agent comprising the polysiloxane having the average composition formula represented by the above general formula (5) contains the bivalent organic group A containing a sulfide group, wet performance, wear resistance, and processability (especially sustenance and prolongation of Mooney scorch time) are further improved. For this reason, it is preferable if the subscript a of the bivalent organic group A containing a sulfide group in general formula (5) satisfies $0 < a \leq 0.50$.

The bivalent organic group A containing a sulfide group may be, for example, a hydrocarbon group optionally having a hetero atom such as an oxygen atom, nitrogen atom, or sulfur atom.

The bivalent organic group A containing a sulfide group is preferably a group represented by general formula (6) below.
[Formula 10]

In the above general formula (6), n denotes an integer from 1 to 10, among which an integer from 2 to 4 is preferred. Also, x denotes an integer from 1 to 6, among which an integer from 2 to 4 is preferred. Furthermore, * indicates a bond position.

Specific examples of the group represented by the above formula (6) include *—$CH_2$—$S_2$—$CH_2$—*, *—$C_2H_4$—$S_2$—$C_2H_4$—*, *—$C_3H_6$—$S_2$—$C_3H_6$—*, *—$C_4H_8$—$S_2$—$C_4H_8$—*, *—$CH_2$—$S_4$—$CH_2$—*, *—$C_2H_4$—$S_4$—$C_2H_4$—*, *—$C_3H_6$—$S_4$—$C_3H_6$—*, *—$C_4H_8$—$S_4$—$C_4H_8$—*, and the like.

The silane coupling agent comprising polysiloxane having the average composition formula represented by the above general formula (5) has excellent affinity and/or reactivity with silica due to having a hydrolyzable group C. It is preferable if the subscript c of the hydrolyzable group C in general formula (5) satisfies $1.2 \leq c \leq 2.0$. Specific examples of the hydrolyzable group include an alkoxy group, a phenoxy group, a carboxyl group, an alkenyloxy group, and the like. As the hydrolyzable group C, a group represented by general formula (7) below is preferred.
[Formula 11]

In the above general formula (7), * denotes a bond position. Furthermore, $R^{12}$ denotes an alkyl group having from 1 to 20 carbons, an aryl group having from 6 to 10 carbons, an aralkyl group (aryl-alkyl group) having from 6 to 10 carbons, or an alkenyl group having from 2 to 10 carbons, among which an alkyl group having from 1 to 5 carbons is preferred.

Specific examples of the alkyl group having from 1 to 20 carbons include a methyl group, an ethyl group, a propyl group, a butyl group, a hexyl group, an octyl group, a decyl group, an octadecyl group, and the like. Specific examples of the aryl group having from 6 to 10 carbons include a phenyl group, a tolyl group, and the like. Specific examples of the aralkyl group having from 6 to 10 carbons include a benzyl group, a phenylethyl group, and the like. Specific examples of the above alkenyl group having from 2 to 10 carbons include a vinyl group, a propenyl group, a pentenyl group, and the like.

The silane coupling agent comprising polysiloxane having the average composition formula represented by the above general formula (5), due to having an organic group D containing a mercapto group, has interaction and/or reactivity with diene rubber, and has excellent wet performance and wear resistance. It is preferable if the subscript d of the organic group D containing a mercapto group satisfies $0.1 \leq d \leq 0.8$. The organic group D containing a mercapto group is preferably a group represented by general formula (8) below.
[Formula 12]

In the above general formula (8), m denotes an integer from 1 to 10, among which an integer from 1 to 5 is preferred. In the formula, * indicates a bond position.

Specific examples of the group represented by the above general formula (8) are *—$CH_2SH$, *—$C_2H_4SH$, *—$C_3H_6SH$, *—$C_4H_8SH$, *—$C_5H_{10}SH$, *—$C_6H_{12}SH$, *—$C_7H_{14}SH$, *—$C_8H_{16}SH$, *—$C_9H_{18}SH$, and *—$C_{10}H_{20}SH$.

In the above general formula (5), $R^{11}$ denotes a monovalent hydrocarbon group having from 1 to 4 carbons. Examples of the hydrocarbon group $R^{11}$ include a methyl group, an ethyl group, a propyl group, and a butyl group.

In the above general formula (5), a to e satisfy the relationships $0 \leq a < 1$, $0 \leq b < 1$, $0 < c < 3$, $0 < d < 1$, $0 \leq e < 2$, $0 < 2a+b+c+d+e < 4$. However, at least one of a and b is not 0. Here, at least one of a and b not being 0 means that when $a=0$, $0<b$, and when $b=0$, $0<a$. Note that both $0<a$ and $0<b$ is possible.

The method for producing the polysiloxane having the average composition formula represented by the above general formula (5) is not particularly limited. For example, it may be produced by hydrolyzing and condensing an organosilicon compound composition containing at least a silane coupling agent having an organic group D containing a mercapto group and a hydrolyzable group C as a starting material. Here, the above organosilicon compound composition may contain silane coupling agents i) to iii) below.

i) Silane coupling agent having a bivalent organic group A containing a sulfide group and a hydrolyzable group C.
ii) Silane coupling agent having a monovalent hydrocarbon group $R^{11}$ having from 1 to 4 carbons and a hydrolyzable group C (alkyl silane coupling agent having a hydrocarbon group having from 1 to 4 carbons).
iii) Alkyl silane coupling agent having a monovalent hydrocarbon group B having from 5 to 10 carbons and a hydrolyzable group C.

The weight average molecular weight of the polysiloxane represented by the average composition formula of formula (5) is preferably from 500 to 2300 and more preferably from 600 to 1500, from the perspective that wet performance, processability and rolling resistance are excellent. The molecular weight of the polysiloxane is the weight average molecular weight determined in terms of polystyrene by gel permeation chromatography (GPC) using toluene as a solvent.

The mercapto equivalent weight of the polysiloxane represented by the average composition formula of formula (5) determined by the acetic acid/potassium iodide/potassium iodate addition-sodium thiosulfate solution titration method is preferably from 550 to 1900 g/mol and more preferably from 600 to 1800 g/mol, from the perspective of having excellent vulcanization reactivity.

Also, as the mercapto-based silane coupling agent used in the present technology, a mercaptosilane compound other than the mercaptosilane compound represented by the above general formula (2), copolymer having the structures of general formulas (3) and (4), and polysiloxane having an average composition formula represented by general formula (5) may be used in combination. Examples of such mercapto-based silane coupling agents include 3-mercaptopropyl(trimethoxysilane), 3-mercaptopropyl(triethoxysilane), 3-mercaptopropyl(diethoxymethoxysilane), 3-mercaptopropyl(tripropoxysilane), 3-mercaptopropyl(dipropoxymethoxysilane), 3-mercaptopropyl(tributoxysilane), 3-mercaptopropyl(dibutoxymethoxysilane), 3-mercaptopropyl(dimethoxymethylsilane), 3-mercaptopropyl(methoxydimethylsilane), 3-mercaptopropyl(diethoxymethylsilane), 3-mercaptopropyl(ethoxydimethylsilane), 3-mercaptopropyl(dipropoxymethylsilane), 3-mercaptopropyl(propoxydimethylsilane), 3-mercaptopropyl(diisopropoxymethylsilane), 3-mercaptopropyl(isopropoxydimethylsilane), 3-mercaptopropyl(dibutoxymethylsilane), 3-mercaptopropyl(butoxydimethylsilane), 2-mercaptoethyl(trimethoxysilane), 2-mercaptoethyl(triethoxysilane), mercaptomethyl(trimethoxysilane), mercaptomethyl(triethoxysilane), 3-mercaptobutyl(trimethoxysilane), 3-mercaptobutyl(triethoxysilane), and the like. Among them, 3-mercaptopropyl(trimethoxysilane) and 3-mercaptopropyl(triethoxysilane) are preferred.

In the rubber composition of the present technology, other silane coupling agents may be compounded as long as they do not hinder the action of the mercapto-based silane coupling agent. The other silane coupling agent is preferably a silane coupling agent containing a sulfur atom, examples of which include bis(3-triethoxysilylpropyl)tetrasulfide, bis(3-triethoxysilylpropyl)disulfide, 3-trimethoxysilylpropyl-benzothiazole tetrasulfide, 3-octanoylthiopropyltriethoxysilane, $(CH_3CH_2O)_3Si(CH_2)_3S—CO—(CH_2)_6CH_3$, and the like. Among these, bis-(3-triethoxysilylpropyl)tetrasulfide is preferred.

The compounded amount of the other silane coupling agents is preferably from 2 to 5% by weight, and more preferably from 2.5 to 4.5% by weight, with respect to the compounded amount of silica. By the compounded amount of other silane coupling agents being within such a range, dispersibility of silica can be further improved without hindering the action of the mercapto-based silane coupling agent.

In the rubber composition of the present technology, diethylene glycol is necessarily compounded. By diethylene glycol being compounded, the viscosity of the rubber composition is reduced and the effect of lengthening scorch time can be obtained. It can also improve cohesion (for example, sheeting capability) as a rubber composition. Here, by restricting the amount of oil in the rubber composition as described below, the effect of diethylene glycol is increased.

The compounded amount of diethylene glycol is from 1 to 6% by weight, and preferably from 2 to 5% by weight, with respect to the compounded amount of silica. If the compounded amount of diethylene glycol is less than 1% by weight, the effects of improving viscosity and suppressing scorch (premature curing) of the rubber composition are not sufficiently obtained. Additionally, cohesion as rubber cannot be improved. If the compounded amount of diethylene glycol exceeds 6% by weight, the effect of hindering the reaction between silica and the silane coupling agent containing a mercapto group becomes excessive, and rolling resistance is adversely affected.

In the present technology, hardness of the rubber composition can be improved and steering stability when the rubber is formed into a tire can be enhanced by restricting the amount of oil in the rubber composition. Because hardness of the rubber composition tends to decrease if the compounded amount of silica is large, the amount of oil need to be reduced to assure steering stability. However, if the amount of oil is restricted, extrudability decreases due to increased viscosity of the rubber composition, scorch time is shortened, and poor cohesion, but maintaining and enhancing extrudability can be improved by compounding the diethylene glycol.

The amount of oil in the rubber composition is not greater than 0.25, and preferably from 0.10 to 0.23, by weight ratio with respect to the weight of the filler containing silica. If the oil/filler weight ratio is greater than 0.25, the effect of improving the hardness of the rubber composition and increasing steering stability is not sufficiently obtained. Here, oil in the rubber composition means the total of the extending oil contained in the compounded diene rubber and the oil components compounded in the rubber composition.

In the rubber composition of the present technology, scorch (premature curing) is preferably suppressed by compounding a vulcanization retarder. The vulcanization retarder is not particularly limited, and any that is regularly used in rubber compositions for tires may be used. A vulcanization retarder represented by general formula (1) below is preferred.

[Formula 13]

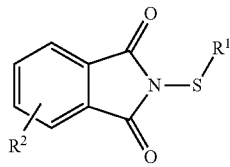

(1)

(In the formula, $R^1$ is a linear hydrocarbon group, alicyclic hydrocarbon group or aromatic hydrocarbon group having from 1 to 10 carbons, $R^2$ is a hydrogen atom, a linear hydrocarbon group or alkoxy group having from 1 to 4 carbons, or a branched hydrocarbon group or alkoxy group having from 3 to 4 carbons.)

$R^1$ is a linear hydrocarbon group having from 1 to 10 carbons, an alicyclic hydrocarbon group such as a cyclohexyl group, or an aromatic hydrocarbon group such as a phenyl group, and is preferably an alicyclic hydrocarbon group such as a cyclohexyl group.

$R^2$ is a hydrogen atom, a linear hydrocarbon group or alkoxy group having from 1 to 4 carbons, or a branched hydrocarbon group or alkoxy group having from 3 to 4 carbons, and is preferably a hydrogen atom.

The compounded amount of the vulcanization retarder is preferably not greater than 1.0 parts by weight, and more preferably not greater than 0.7 parts by weight, per 100 parts by weight of diene rubber. If the compounded amount of vulcanization retarder exceeds 1.0 parts by weight, there is risk that it will take too much time for curing to complete.

The rubber composition for use in tire treads may also include various compounding agents that are commonly used in rubber compositions for use in tire treads. Examples thereof include vulcanization or cross-linking agents, vulcanization accelerators, antiaging agents, plasticizers, processing aids, liquid polymers, thermosetting resins, thermoplastic resins, and the like. These compounding agents can be kneaded by a common method to obtain a composition that can then be used for vulcanization or cross-linking. These compounding agents can be compounded in conventional general amounts so long as the objects of the present technology are not hindered. The rubber composition for use in tire treads can be produced by mixing the above-mentioned components using a well-known rubber kneading machine such as a Banbury mixer, a kneader, a roller, or the like.

The rubber composition for use in tire treads of the present technology can be advantageously used in pneumatic tires. A pneumatic tire that uses this rubber composition in the tread portions can have excellent productivity and quality stability due to its excellent extrudability, and can improve low rolling resistance and wet performance to conventional levels or above.

The present technology is further described below by examples. However, the scope of the present technology is not limited to these examples.

EXAMPLES

Twenty-three types of rubber compositions for use in tire treads were prepared according to the formulations shown in Tables 1 to 3 (Working Examples 1 to 14 and Comparative Examples 1 to 9). The compounding agent as shared formulation shown in Table 4 (with the exception of the sulfur, vulcanization accelerator, and vulcanization retarder) were compounded with the rubber compositions, and the mixtures were kneaded in a 1.8 L sealed mixer for 5 minutes at 160° C. The mixtures were then extruded as master batches, to which the sulfur, vulcanization accelerator and vulcanization retarder were added. The master batches were then kneaded with an open roller.

Moreover, in Tables 1 to 3, SBR and modified SBR contain 37.5 parts by weight and 25 parts by weight or 20 parts by weight of extending oil, respectively, meaning that the compounded amount rows show the actual compounded amount and in parentheses, the net compounded amount of SBR excluding the extending oil. Furthermore, the compounding agent amounts shown in Table 4 are expressed as parts by weight per 100 parts by weight of the diene rubbers (net amount of rubber) shown in Tables 1 to 3.

Using the obtained 23 types of rubber composition for tire treads as samples, sheeting capability, viscosity, and scorch suppression were evaluated by the methods described below.

Sheeting Capability

Using the obtained rubber compositions as samples, the cohesion of the rubber was functionally evaluated and the sheeting capability was evaluated when the rubber was passed through 8×16 inch rollers. The obtained results are shown in Tables 1 to 3 as a score on five levels from 1 to 5. A score of 3 is used as a reference, and a score below that indicates poor sheeting capability, while a score above that indicates that sheeting capability is excellent.

Viscosity

Mooney viscosity ($ML_{1+4}$) of the obtained rubber composition was measured in accordance with JIS (Japan Industrial Standard) K6300 using an L-type rotor (diameter: 38.1 mm, thickness: 5.5 mm) in a Mooney viscometer under the conditions of a preheating time of 1 minute, a rotor rotation time of 4 minutes, 100° C., and 2 rpm. The obtained results are shown in Tables 1 to 3, expressed as an index with the value of Comparative Example 1 taken as 100. Smaller values of this index mean that viscosity is lower and extrudability is better.

Scorch

The scorch time of the obtained rubber composition was measured in accordance with JIS K 6300-1: 2001 using an L-shaped rotor at a test temperature of 125°. The obtained results are shown in Tables 1 to 3, expressed as an index with the value of Comparative Example 1 taken as 100. Larger values of this index mean that scorch time is longer and extrudability is better.

Next, sets of five pneumatic tires having a tire size of 255/50R17 were fabricated. In each of the sets of five tires, one of the 23 types of rubber compositions for use in tire treads described above was used in the tread portion. The wet performance (braking performance on a wet road surface), rolling resistance, and steering stability of the obtained 23 types of pneumatic tire were evaluated according to the methods described below. Wet performance (braking performance on a wet road surface)

The obtained pneumatic tires were assembled on a wheel having a rim size of 7×J, and mounted on a 2.5 L class test vehicle (made in Japan). The pneumatic tires were inflated to an air pressure of 230 kPa and the test vehicle was driven on a 2.6 km circuit wet road surface test course. The braking performance while driving was scored based on sensory evaluation performed by three experienced evaluators. The obtained results are shown on the "Wet performance" rows of Tables 1 to 3, expressed as an index with the value of Comparative Example 1 taken as 100. Larger index values indicate superior wet braking performance on wet road surfaces.

Rolling Resistance

The obtained pneumatic tires were assembled on a wheel having a rim size of 7×J, and inflated to an air pressure of 230 kPa. Each was mounted on a laboratory drum tester (drum diameter 1707 mm) conforming to JIS D 4230, and the resistance force was measured under a test load of 2.94 kN at a speed of 50 km/h. The obtained results are shown on the "Rolling resistance" rows of Tables 1 to 3, expressed as an index with the value of Comparative Example 1 taken as 100. Smaller index values indicate lower rolling resistance and superior fuel consumption performance.

Steering Stability

The obtained pneumatic tires were assembled on a wheel having a rim size of 7×J, and mounted on a 2.5 L class test vehicle (made in Japan). The pneumatic tires were inflated to an air pressure of 230 kPa and the test vehicle was driven on a 12 km circuit dry road surface test course. The steering stability while driving was scored based on sensory evaluation performed by three experienced evaluators. The obtained results are shown on the "Steering stability" rows of Tables 1 to 3, expressed as an index with the value of Comparative Example 1 taken as 100. Larger index values indicate superior driving stability.

TABLE 1

|  |  | Comparative Example 1 | Comparative Example 2 | Comparative Example 3 |
|---|---|---|---|---|
| SBR | pbw | 20.6(15) | 20.6(15) | 20.6(15) |
| Modified SBR | pbw | 68.8(55) | 68.8(55) | 68.8(55) |
| BR | pbw | 30 | 30 | 30 |
| NR | pbw |  |  |  |
| Silica | pbw | 80 | 80 | 80 |
| Carbon black | pbw | 10 | 10 | 10 |
| Coupling agent 1 | pbw | 8.8 | 8.8 | 8.8 |
| DEG | pbw | 0.05 | 2.4 | 0.05 |
| Vulcanization retarder | pbw |  |  |  |
| Oil | pbw | 10.6 | 10.6 |  |
| Total amount of oil | pbw | 30 | 30 | 19.4 |
| Weight ratio (oil/filler) - |  | 0.33 | 0.33 | 0.22 |
| Wet performance | Index value | 100 | 100 | 96 |
| Rolling resistance | Index value | 100 | 101 | 103 |
| Steering stability | Index value | 100 | 102 | 105 |
| Sheeting capability | Index value | 3 | 4 | 1 |
| Viscosity | Index value | 100 | 97 | 105 |
| Scorch | Index value | 100 | 98 | 96 |

|  |  | Working Example 1 | Comparative Example 4 | Comparative Example 5 | Working Example 2 |
|---|---|---|---|---|---|
| SBR | pbw | 20.6(15) | 41.3(30) | 41.3(30) | 20.6(15) |
| Modified SBR | pbw | 68.8(55) | 50(40) | 50(40) | 68.8(55) |
| BR | pbw | 30 | 30 | 30 | 30 |
| NR | pbw |  |  |  |  |
| Silica | pbw | 80 | 80 | 80 | 80 |
| Carbon black | pbw | 10 | 10 | 10 | 10 |
| Coupling agent 1 | pbw | 8.8 | 8.8 | 8.8 | 8.8 |
| DEG | pbw | 2.4 | 0.05 | 2.4 | 2.4 |
| Vulcanization retarder | pbw |  |  |  | 0.4 |
| Oil | pbw |  |  |  |  |
| Total amount of oil | pbw | 19.4 | 21.3 | 21.3 | 19.4 |
| Weight ratio (oil/filler) - |  | 0.22 | 0.24 | 0.24 | 0.22 |
| Wet performance | Index value | 103 | 92 | 96 | 104 |
| Rolling resistance | Index value | 96 | 107 | 103 | 96 |
| Steering stability | Index value | 108 | 103 | 106 | 107 |
| Sheeting capability | Index value | 3 | 3 | 4 | 3 |
| Viscosity | Index value | 98 | 104 | 98 | 97 |
| Scorch | Index value | 100 | 97 | 100 | 106 |

TABLE 2

|  |  | Working Example 3 | Working Example 4 | Working Example 5 | Working Example 6 |
|---|---|---|---|---|---|
| SBR | pbw | 20.6(15) | 20.6(15) | 20.6(15) | 20.6(15) |
| Modified SBR | pbw | 68.8(55) | 68.8(55) | 68.8(55) | 68.8(55) |
| BR | pbw | 30 | 30 | 30 | 30 |
| NR | pbw |  |  |  |  |
| Silica | pbw | 80 | 80 | 80 | 80 |
| Carbon black | pbw | 10 | 10 | 10 | 10 |
| Coupling agent 1 | pbw | 8.8 | 8.8 |  |  |
| Coupling agent 2 | pbw |  |  | 8.8 |  |
| Coupling agent 3 | pbw |  |  |  | 8.8 |
| Coupling agent 4 | pbw |  |  |  |  |
| Coupling agent 5 | pbw | 2.4 | 2.4 | 2.4 | 2.4 |
| DEG | pbw | 2.4 | 2.4 | 2.4 | 2.4 |
| Vulcanization retarder | pbw |  | 0.4 | 0.4 | 0.4 |
| Oil | pbw |  |  |  |  |
| Total amount of oil | pbw | 19.4 | 19.4 | 19.4 | 19.4 |
| Weight ratio (oil/filler) - |  | 0.22 | 0.22 | 0.22 | 0.22 |
| Wet performance | Index value | 106 | 107 | 104 | 110 |
| Rolling resistance | Index value | 92 | 93 | 96 | 91 |
| Steering stability | Index value | 111 | 110 | 108 | 111 |
| Sheeting capability | Index value | 4 | 4 | 4 | 4 |
| Viscosity | Index value | 93 | 92 | 90 | 85 |
| Scorch | Index value | 104 | 109 | 107 | 115 |

|  |  | Working Example 7 | Working Example 8 | Working Example 9 | Working Example 10 |
|---|---|---|---|---|---|
| SBR | pbw | 20.6(15) | 20.6(15) | 20.6(15) | 20.6(15) |
| Modified SBR | pbw | 68.8(55) | 68.8(55) | 68.8(55) | 68.8(55) |
| BR | pbw | 30 |  |  |  |
| NR | pbw |  | 30 | 30 | 30 |
| Silica | pbw | 110 | 80 | 80 | 80 |
| Carbon black | pbw | 10 | 10 | 10 | 10 |
| Coupling agent 1 | pbw | 12.1 | 8.8 | 8.8 |  |
| Coupling agent 2 | pbw |  |  |  | 8.8 |
| Coupling agent 3 | pbw |  |  |  |  |
| Coupling agent 4 | pbw |  |  |  |  |
| Coupling agent 5 | pbw | 2.4 |  | 2.4 |  |
| DEG | pbw | 3.3 | 2.4 | 2.4 | 2.4 |
| Vulcanization retarder | pbw | 0.4 | 0.4 | 0.4 | 0.4 |
| Oil | pbw | 10 |  |  |  |
| Total amount of oil | pbw | 29.4 | 19.4 | 19.4 | 19.4 |
| Weight ratio (oil/filler) - |  | 0.25 | 0.22 | 0.22 | 0.22 |

TABLE 2-continued

| | | | | | |
|---|---|---|---|---|---|
| Wet performance | Index value | 116 | 109 | 112 | 109 |
| Rolling resistance | Index value | 98 | 98 | 95 | 98 |
| Steering stability | Index value | 115 | 109 | 112 | 110 |
| Sheeting capability | Index value | 3 | 5 | 5 | 5 |
| Viscosity | Index value | 98 | 98 | 93 | 91 |
| Scorch | Index value | 104 | 104 | 107 | 105 |

TABLE 3

| | | Working Example 11 | Working Example 12 | Working Example 13 | Working Example 14 |
|---|---|---|---|---|---|
| SBR | pbw | 20.6(15) | 20.6(15) | 20.6(15) | |
| Modified SBR | pbw | 68.8(55) | 68.8(55) | 68.8(55) | 75 (60) |
| BR | pbw | | | | |
| NR | pbw | 30 | 30 | 30 | 40 |
| Silica | pbw | 80 | 80 | 110 | 80 |
| Carbon black | pbw | 10 | 10 | 10 | 10 |
| Coupling agent 1 | pbw | | | 12.1 | 8.8 |
| Coupling agent 3 | pbw | 8.8 | | | |
| Coupling agent 4 | pbw | | 8.8 | | |
| Coupling agent 5 | pbw | | | 2.4 | 2.4 |
| DEG | pbw | 2.4 | 2.4 | 3.3 | 2.4 |
| Vulcanization retarder | pbw | 0.4 | 0.4 | 0.4 | 0.4 |
| Oil | pbw | | | 10 | 5 |
| Total amount of oil | pbw | 19.4 | 19.4 | 29.4 | 20 |
| Weight ratio (oil/filler) - | | 0.22 | 0.22 | 0.25 | 0.22 |
| Wet performance | Index value | 112 | 116 | 121 | 115 |
| Rolling resistance | Index value | 94 | 90 | 99 | 94 |
| Steering stability | Index value | 112 | 111 | 117 | 114 |
| Sheeting capability | Index value | 5 | 5 | 5 | 5 |
| Viscosity | Index value | 87 | 89 | 99 | 94 |
| Scorch | Index value | 113 | 108 | 102 | 105 |

| | | Comparative Example 6 | Comparative Example 7 | Comparative Example 8 | Comparative Example 9 |
|---|---|---|---|---|---|
| SBR | pbw | 20.6(15) | 20.6(15) | 20.6(15) | 20.6(15) |
| Modified SBR | pbw | 68.8(55) | 68.8(55) | 68.8(55) | 68.8(55) |
| BR | pbw | 30 | 30 | 30 | 30 |
| NR | pbw | | | | |
| Silica | pbw | 80 | 80 | 50 | 80 |
| Carbon black | pbw | 10 | 10 | 40 | 10 |
| Coupling agent 1 | pbw | 2.4 | 13.6 | 5.5 | 8.8 |
| Coupling agent 3 | pbw | | | | |
| Coupling agent 4 | pbw | | | | |
| Coupling agent 5 | pbw | 8.8 | 2.4 | 1.5 | 2.4 |
| DEG | pbw | 2.4 | 2.4 | 1.5 | 5.6 |
| Vulcanization retarder | pbw | 0.4 | 0.4 | 0.4 | 0.4 |
| Oil | pbw | | | | |
| Total amount of oil | pbw | 19.4 | 19.4 | 19.4 | 19.4 |
| Weight ratio (oil/filler) - | | 0.22 | 0.22 | 0.22 | 0.22 |
| Wet performance | Index value | 97 | 110 | 98 | 101 |
| Rolling resistance | Index value | 108 | 89 | 118 | 102 |
| Steering stability | Index value | 98 | 107 | 112 | 104 |
| Sheeting capability | Index value | 5 | 1 | 4 | 5 |
| Viscosity | Index value | 88 | 115 | 87 | 88 |
| Scorch | Index value | 110 | 90 | 108 | 108 |

The types of raw materials used in Tables 1 to 3 are shown below.

SBR: Unmodified styrene butadiene rubber; oil extended product comprising 37.5 parts by weight of oil per 100 parts by weight of rubber component; Nipol NS522, manufactured by Zeon Corporation Modified S-SBR2: Hydroxyl group-containing modified styrene butadiene rubber; oil extended product comprising 25 parts by weight of oil per 100 parts by weight of rubber component; Nipol NS570, manufactured by Zeon Corporation BR: Butadiene rubber; Nipol BR1220, manufactured by Zeon Corporation NR: Natural rubber; RSS #3

Silica: 1165 MP, manufactured by Rhodia

Carbon black: Sho Black N339, manufactured by Cabot Japan Co., Ltd.

Coupling agent 1: Mercapto-based silane coupling agent represented by the above general formula (2) $[C_{13}H_{27}O(CH_2CH_2O)_5]_2(CH_2CH_2O)Si(CH_2)_3SH$; Si353, manufactured by Evonik-Degussa Coupling agent 2: Mercapto-based silane coupling agent having segments represented by the above general formulas (3) and (4) ($R^7$, $R^9$: ethyl group, $R^8$, $R^{10}$: ethylene group; 55 mol % segments of formula (3), 45 mol % segments of formula (4); NXT-Z45, manufactured by Momentive Performance Materials Inc.

Coupling agent 3: Silane coupling agent comprising polysiloxane 1 obtained by production method described below and polysiloxane having the average composition formula represented by the above general formula (5) $[(-C_3H_6-S_4-C_3H_6-)_{0.071}(-C_8H_{17})_{0.571}(-OC_2H_5)_{1.50}(-C_3H_6SH)_{0.286}SiO_{0.75}]$ Coupling agent 4: Silane coupling agent comprising polysiloxane 2 obtained by production method described below and polysiloxane having the average composition formula represented by the above general formula (5) $[(-C_8H_{17})_{0.667}(-OC_2H_5)_{1.50}(-C_3H_6SH)_{0.333}SiO_{0.75}]$ Coupling agent 5: Bis(3-triethoxysilylpropyl)tetrasulfide; Si69, manufactured by Evonik-Degussa DEG: Diethylene glycol; Diethylene Glycol manufactured by Nippon Shokubai Co., Ltd.

Vulcanization retarder: Vulcanization retarder represented by the above formula (1) ($R^1$: cyclohexyl group, $R^2$: hydrogen); N-cyclohexyl-thiophthalimide PVI, manufactured by Toray Fine Chemicals Co., Ltd.

Oil: Extract No. 4S, manufactured by Showa Shell Sekiyu Co., Ltd.

<Production Method of Coupling Agent 3 (Polysiloxane 1)>

107.8 g (0.2 mol) of bis(triethoxysilylpropyl)tetrasulfide (KBE-846, manufactured by Shin-Etsu Chemical Co., Ltd.), 190.8 g (0.8 mol) of γ-mercaptopropyl triethoxysilane (KBE-803, manufactured by Shin-Etsu Chemical Co., Ltd.), 442.4 g (1.6 mol) of octyl triethoxysilane (KBE-3083, manufactured by Shin-Etsu Chemical Co., Ltd.), and 190.0 g of ethanol were placed in a 2 L separable flask provided with an agitator, a reflux condenser, a dropping funnel and a thermometer, and then a mixed solution containing 37.8 g (2.1 mol) of 0.5 N hydrochloric acid and 75.6 g of ethanol was added in a dropwise manner at room temperature. It was then stirred for 2 hours at 80° C. Then, it was filtered, and 17.0 g of 5% KOH/EtOH solution was added in a dropwise manner, and stirred for 2 hours at 80° C. Then, by vacuum concentration and filtration, 480.1 g of polysiloxane in the form of a brown transparent liquid was obtained. As a result of measurement by GPC, the average molecular weight was 840, and the average degree of polymerization was 4.0 (preset degree of polymerization: 4.0). In addition, as a result of measuring the mercapto equivalent weight by the acetic acid/potassium iodide/potassium iodate addition/sodium thiosulfate solution titration method, the equivalent weight was 730 g/mol, and it was thus confirmed that the preset mercapto group content was achieved. The polysiloxane obtained as described above is represented by the following average composition formula.

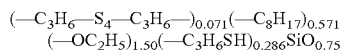

$$(-C_3H_6-S_4-C_3H_6-)_{0.071}(-C_8H_{17})_{0.571}$$
$$(-OC_2H_5)_{1.50}(-C_3H_6SH)_{0.286}SiO_{0.75}$$

The obtained polysiloxane was used as polysiloxane 1.
<Production Method of Coupling Agent 4 (Polysiloxane 2)>

190.8 g (0.8 mol) of γ-mercaptopropyl triethoxysilane (KBE-803, manufactured by Shin-Etsu Chemical Co., Ltd.), 442.4 g (1.6 mol) of octyl triethoxysilane (KBE-3083, manufactured by Shin-Etsu Chemical Co., Ltd.), and 162.0 g of ethanol were placed in a 2 L separable flask provided with an agitator, a reflux condenser, a dropping funnel and a thermometer, and then a mixed solution containing 32.4 g (1.8 mol) of 0.5 N hydrochloric acid and 75.6 g of ethanol was added in a dropwise manner at room temperature. It was then stirred for 2 hours at 80° C. Then, it was filtered, and 14.6 g of 5% KOH/EtOH solution was added in a dropwise manner, and stirred for 2 hours at 80° C. Then, by vacuum concentration and filtration, 412.3 g of polysiloxane in the form of a colorless transparent liquid was obtained. As a result of measurement by GPC, the average molecular weight was 850, and the average degree of polymerization was 4.0 (preset degree of polymerization: 4.0). In addition, as a result of measuring the mercapto equivalent weight by the acetic acid/potassium iodide/potassium iodate addition/sodium thiosulfate solution titration method, the equivalent weight was 650 g/mol, and it was thus confirmed that the preset mercapto group content was achieved. The polysiloxane obtained as described above is represented by the following average composition formula.

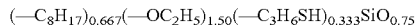

$$(-C_8H_{17})_{0.667}(-OC_2H_5)_{1.50}(-C_3H_6SH)_{0.333}SiO_{0.75}$$

The obtained polysiloxane was used as polysiloxane 2.

TABLE 4

| Shared Formulation of the Rubber Compositions | | |
| --- | --- | --- |
| Zinc oxide | pbw | 3.0 |
| Stearic acid | pbw | 2.0 |
| Antiaging agent | pbw | 2.0 |
| Processing aid | pbw | 2.0 |
| Sulfur | pbw | 2.0 |
| Vulcanization accelerator 1 | pbw | 1.0 |
| Vulcanization accelerator 2 | pbw | 2.3 |

The types of raw materials used in Table 4 are shown below.

Zinc oxide: Zinc Oxide #3, manufactured by Seido Chemical Industry Co., Ltd.

Stearic acid: Beads Stearic Acid NY, manufactured by NOF Co., Ltd.

Antiaging agent: Santoflex 6PPD 6C, manufactured by FlexSys, Inc.

Processing aid: Struktol A50P, manufactured by Struktol Corp.

Sulfur: "Golden Flower" oil-treated sulfur powder, manufactured by Tsurumi Chemical Industry Co., Ltd.

Vulcanization accelerator: Vulcanization accelerator TBzTD; Perkacit TBzTD, manufactured by FlexSys, Inc.

Vulcanization accelerator 2: Vulcanization accelerator CBS; Nocceler CZ-G, manufactured by Ouchi Shinko Chemical Industrial Co., Ltd.

As is clear from Tables 1 to 3, it was ascertained that the rubber compositions for tire treads of Working Examples 1 to 14 enhance wet performance, rolling resistance, and steering stability to conventional levels or above while maintaining sheeting capability, viscosity, and scorch (premature curing) suppression.

In the rubber composition of Comparative Example 2, because the weight ratio of oil with respect to filler in the rubber composition exceeds 0.25, rolling resistance cannot be improved, and steering stability is considerably poorer than that of the working examples. Also, rolling resistance cannot be improved.

In the rubber composition of Comparative Example 3, because the compounded amount of diethylene glycol is less than 1% by weight of the silica content, sheeting capability, viscosity, and scorch suppression are poor. Also, wet performance and rolling resistance are adversely affected.

In the rubber composition of Comparative Example 4, because the compounded amount of modified SBR is less than 50% by weight and the compounded amount of diethylene glycol is less than 1% by weight of the silica content, viscosity and scorch suppression are poor. Also, wet performance and rolling resistance are adversely affected.

In the rubber composition of Comparative Example 5, because the compounded amount of modified SBR is less than 50% by weight, wet performance and rolling resistance are adversely affected.

As is clear from Table 3, in the rubber composition of Comparative Example 6, because the compounded amount of mercapto-based silane coupling agent is less than 4% by weight of the silica content, wet performance, rolling resistance, and steering stability are poor.

In the rubber composition of Comparative Example 7, because the compounded amount of mercapto-based silane coupling agent exceeds 15% by weight of the silica content, viscosity and scorch suppression are poor, and sheeting capability is not good.

In the rubber composition of Comparative Example 8, because the compounded amount of silica is less than 60 parts by weight, wet performance and rolling resistance are poor.

In the rubber composition of Comparative Example 9, because the compounded amount of diethylene glycol exceeds 6% by weight of the silica content, rolling resistance is adversely affected.

The invention claimed is:
1. A rubber composition for use in tire treads comprising: from 60 to 130 parts by weight of silica per 100 parts by weight of diene rubber containing not less than 50% by weight of hydroxyl group-containing modified styrene butadiene rubber, wherein:
a weight ratio of oil with respect to filler containing the silica is not greater than 0.25,
a silane coupling agent having a mercapto group and an Si—O bond is compounded in an amount from 4 to 15% by weight of the silica content,
diethylene glycol is compounded in an amount from 1 to 6% by weight of the silica content;
the silane coupling agent having a mercapto group and an Si—O bond is a mercaptosilane compound represented by general formula (2) below, or a copolymer having the structures of general formulas (3) and (4) below, or a polysiloxane having an average composition formula represented by general formula (5) below:

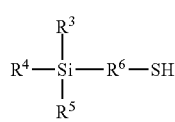
(2)

(wherein $R^3$, $R^4$, and $R^5$ are mutually independently selected from hydrogen, alkyl groups having from 1 to 8 carbons, alkoxy groups having from 1 to 8 carbons, linear polyether groups having a chain length of from 4 to 30, and aryl groups having from 6 to 30 carbons, and, at least one is the alkoxy group and at least one is the linear polyether group, and $R^6$ is an alkylene group having from 1 to 30 carbons);

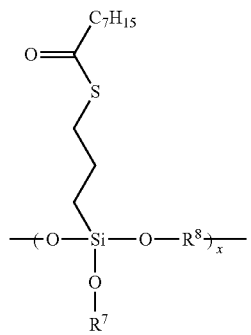
(3)

(wherein $R^7$ and $R^8$ may form a ring structure, and $R^7$ is selected from hydrogen, halogen, or alkyl groups or alkylene groups having from 1 to 30 carbons, alkenyl groups or alkenylene groups having from 2 to 30 carbons, alkynyl groups or alkynylene groups having from 2 to 30 carbons, and groups in which a terminal of the above alkyl group or alkenyl group is substituted with a hydroxyl group or carboxyl group; $R^8$ is an alkylene group having from 1 to 30 carbons, an alkenylene group having from 2 to 30 carbons, or an alkynylene group having from 2 to 30 carbons; x is an integer of 1 or greater);

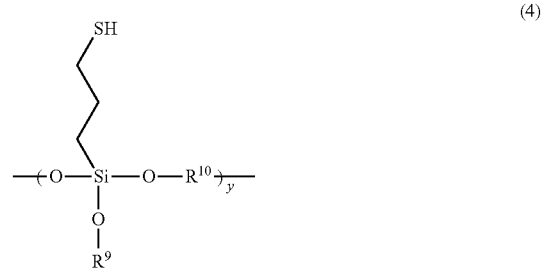
(4)

(wherein $R^9$ and $R^{10}$ may form a ring structure, and $R^9$ is selected from a hydrogen, halogen, or alkyl groups or alkylene groups having from 1 to 30 carbons, alkenyl groups or alkenylene groups having from 2 to 30 carbons, alkynyl groups or alkynylene groups having from 2 to 30 carbons, and groups in which a terminal of the above alkyl group or alkenyl group is substituted with a hydroxyl group or carboxyl group; $R^{10}$ is an alkylene group having from 1 to 30 carbons, an alkenylene group having from 2 to 30 carbons, or an alkynylene group having from 2 to 30 carbons; y is an integer of 1 or greater);

$$(A)_a(B)_b(C)_c(D)_d(R^{11})_e SiO_{(4-2a-b-c-d-e)/2} \qquad (5)$$

(wherein A is a bivalent organic group containing a sulfide group; B is a monovalent hydrocarbon group having from 5 to 10 carbons; C is a hydrolyzable group; D is an organic group containing a mercapto group; $R^{11}$ is a monovalent hydrocarbon group having from 1 to 4 carbons; and a to e satisfy relationships $0 \leq a < 1$, $0 \leq b < a$, $0 < c < 3$, $0 < d < 1$, $0 \leq e < 2$, and $0 < 2a+b+c+d+e < 4$; however, at least one of a and b is not 0).

2. The rubber composition for tire treads according to claim 1, wherein bis(3-triethoxysilylpropyl) tetrasulfide is compounded in an amount from 2 to 5% by weight of the silica content.

3. The rubber composition for tire treads according to claim 2, wherein a vulcanization retarder represented by general formula (1) below is compounded in an amount greater than 0 parts by weight and not greater than 1.0 parts by weight per 100 parts by weight of the diene rubber:

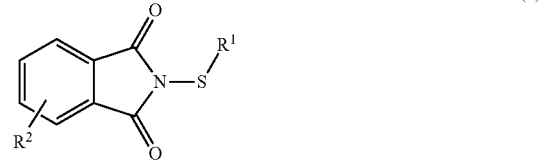
(1)

(wherein $R^1$ is a linear hydrocarbon group, alicyclic hydrocarbon group or aromatic hydrocarbon group having from 1 to 10 carbons, $R^2$ is a hydrogen atom, a linear hydrocarbon group or alkoxy group having from 1 to 4 carbons, or a branched hydrocarbon group or alkoxy group having from 3 to 4 carbons).

4. The rubber composition for use in tire treads according to claim 3, wherein the diene rubber contains greater than 0% by weight and not greater than 45% by weight of natural rubber.

5. The rubber composition for tire treads according to claim 1, wherein a vulcanization retarder represented by general formula (1) below is compounded in an amount greater than 0 parts by weight and not greater than 1.0 parts by weight per 100 parts by weight of the diene rubber:

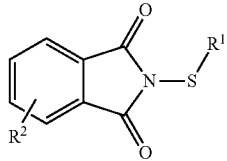
(1)

(wherein $R^1$ is a linear hydrocarbon group, alicyclic hydrocarbon group or aromatic hydrocarbon group having from 1 to 10 carbons, $R^2$ is a hydrogen atom, a linear hydrocarbon group or alkoxy group having from 1 to 4 carbons, or a branched hydrocarbon group or alkoxy group having from 3 to 4 carbons).

6. The rubber composition for use in tire treads according to claim 5, wherein the diene rubber contains greater than 0% by weight and not greater than 45% by weight of natural rubber.

7. The rubber composition for use in tire treads according to claim 2, wherein the diene rubber contains greater than 0% by weight and not greater than 45% by weight of natural rubber.

8. The rubber composition for use in tire treads according to claim 1, wherein the diene rubber contains greater than 0% by weight and not greater than 45% by weight of natural rubber.

9. A pneumatic tire comprising the rubber composition for use in tire treads described in claim 3.

10. A pneumatic tire comprising the rubber composition for use in tire treads described in claim 2.

11. A pneumatic tire comprising the rubber composition for use in tire treads described in claim 1.

* * * * *